UNITED STATES PATENT OFFICE.

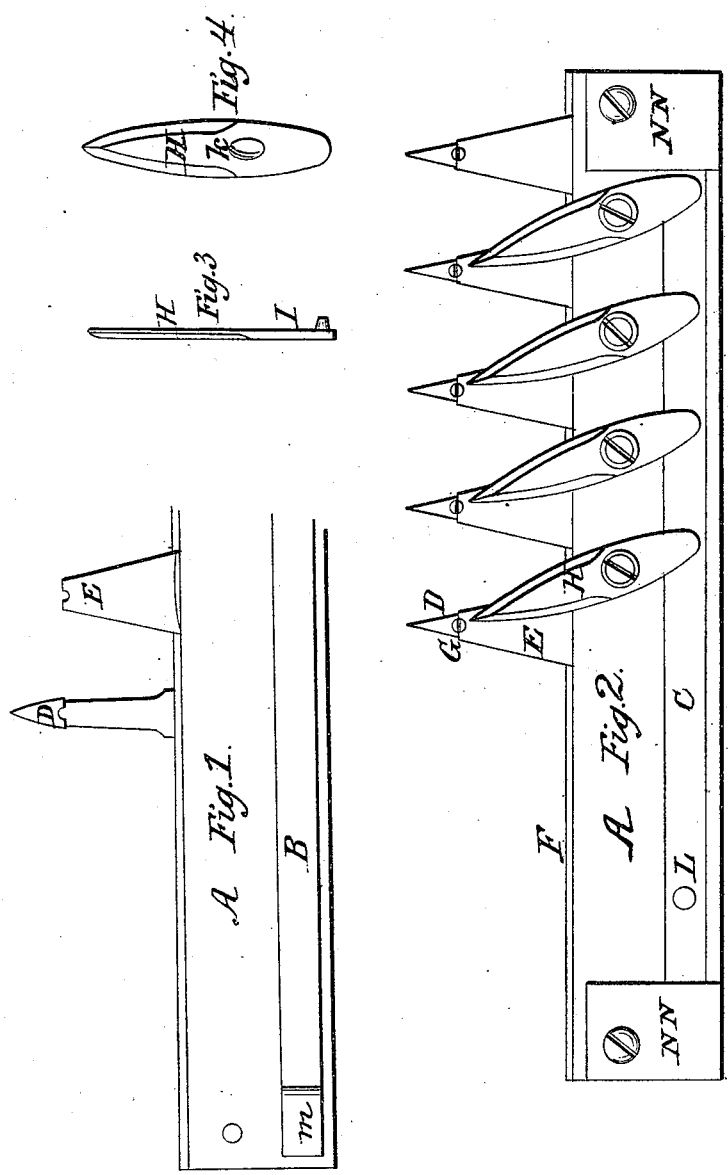

JOHN GORE, OF FREDONIA, NEW YORK.

IMPROVEMENT IN CUTTERS FOR HARVESTERS.

Specification forming part of Letters Patent No. 19,360, dated February 16, 1858.

*To all whom it may concern:*

Be it known that I, JOHN GORE, of Fredonia, in the county of Chautauqua, in the State of New York, have invented a new and useful Improvement in the Mode of Cutting Grass and Grain; and I do hereby declare that the following is a full and exact description thereof, reference being had to the accompanying drawings, and to the letters of reference marked thereon.

The nature of my invention consists in the cutting apparatus of mowing and harvesting machines for the purpose of cutting the said grass and grain with a vibratory drawing shear cut and overcoming the momentum of the sliding bar, connecting-rod, and their appurtenances, as follows:

I make a cutting-bar, A, Figure 1, in any of the ordinary forms in use. I plane a groove, B, in and on the top of said bar, for the purpose of and just large enough to admit fully the sliding bar C, Fig. 2, to play freely endwise from the crank or other motion.

I make the finger D, Fig. 2, in the ordinary way, and place on the top of it a steel cutter, which I let into a beveled rabbet, F, on the front edge of the cutting-bar A, to prevent the back end of said cutter E from rising, the front end being let into the finger D in like manner, forming a dovetail, and when a screw, G, is let partly into the fore end of the said cutter E and partly into the shoulder of and screwed into the finger D, prevents its sliding out of the dovetail and holds the cutter E firmly in its position.

I make a moving cutter, H, Fig. 3, with a conical truncated inverted pivot, I, on the back, and projecting down into a corresponding conical hole in the sliding bar. Said cutter H has a slotted or oblong hole, K, Fig. 4, through near its center, for the purpose of holding it with a screw to the cutting-bar and allowing it to turn, rock, and slide endwise on said screw as the cutter H is vibrated by the sliding bar C, which is let into a groove in the cutting-bar A, and only allowed to vibrate endwise, said sliding bar being made with a conical hole, L, largest at the top and nearest the cutter, to allow the pivot to form a rocking motion on said cutter H, to raise the opposite edge and compress the cutting-edge, which changes at each vibration, and the hole is also made largest at the top of the sliding bar C, to secure an inclined plane for the conical truncated pivot on the cutter H to fit loosely when at rest, and when motion is given to the said cutter H from said sliding bar through the said truncated pivot, not only to produce the vibratory rocking and drawing motion of said cutter H, but to cause the rearmost end to rise, lifting the back end, and thus bring the edge of the moving cutter H firmly down upon the edge of the stationary cutter E. By this arrangement I avoid the necessity of giving play laterally to the sliding bar C. As it always moves in a straight line, it can be made to fit closely in the groove in bar A, or I may find it convenient to place it in the rear of bar A in the same manner. Consequently no dirt is allowed to get into the groove. The sliding bar C runs at each end into a box against a piece of confined rubber, $m$, Fig. 1, to overcome the momentum of its reciprocating motion, which is taken from the gearing in any of the ordinary ways in common use. N N, Fig. 2, buffer-box and guides for sliding bar.

I have tried various ways for cutting grass and grain, the more important of which are, first, to fasten with a screw the moving cutter to the cutter-bar near its center, and making a slot in the back of the cutter, at or near the end, and vibrating it with a knob or projection on the sliding bar, thinnest at the top, which gives a tolerable side motion to the cutter, but does not give the drawing cut which I prefer; second, I have tried a straight loose pivot to work in the sliding bar and fast in the cutter to vibrate the cutter when fastened with the slotted hole near the center; but this is not so good, as I do not get the lifting motion, as in case of the conical pivot; third, I have also tried the straight pivot, (with the cutter fastened near the center, with a screw through a round hole in the cutter to hold it to the cutter-bar,) which pivot was also loose in the slide-bar, and without a slot for either pin to play in, in which case the sliding bar must vibrate back and forward, which is objectionable in two ways: first, it cannot or does not give the drawing cut, and, second, in its vibrations leaves an opening for the grass or grain to fall into between the said sliding bar and the cutting-bar; fourth, I have tried an oblong hole in the sliding bar for the conical pivot on the moving cutter to work in.

The objection to this is it would require too heavy a slide-bar to leave sufficient strength, besides other objections.

What I claim as my invention, and desire to secure by Letters Patent, is—

The cutters H, as constructed with the conical truncated pivot near its end and oblong aperture near its center, for the purpose set forth, in combination with the cutter E, when secured on bar A and fingers D by dovetails and set-screws, as described, and for the purpose specified.

JOHN GORE. [L. S.]

Witnesses:
J. HARDY PRINCE,
J. S. RICHARDSON.